United States Patent [19]
Trevino

[11] Patent Number: 5,305,571
[45] Date of Patent: Apr. 26, 1994

[54] STRUCTURAL FRAME ASSEMBLY

[76] Inventor: José A. Trevino, 3139 Chesterfield Ln., Stafford, Tex. 77477-4605

[21] Appl. No.: 936,351

[22] Filed: Aug. 28, 1992

[51] Int. Cl.⁵ ............................................ E04H 12/10
[52] U.S. Cl. ..................................... 52/653.2; 52/646; 52/653.1; 52/655.1; 403/217
[58] Field of Search ................. 52/475, 780, 781, 721, 52/653.1, 655.1, 653.2, 646; 403/170, 217, 218, 219, 241, 383, 407.1, 408.1

[56] References Cited

U.S. PATENT DOCUMENTS

| | | | |
|---|---|---|---|
| 2,018,539 | 10/1935 | Welsh | 403/218 |
| 2,683,329 | 7/1954 | Kobler | 403/218 X |
| 2,709,318 | 5/1955 | Benjamin | 403/217 X |
| 3,343,318 | 9/1967 | Birum | 52/781 X |
| 3,528,559 | 9/1970 | Miller | 52/781 X |
| 4,688,358 | 8/1987 | Madray | 52/721 X |
| 4,914,888 | 4/1990 | Hanson | 52/780 X |

Primary Examiner—Carl D. Friedman
Assistant Examiner—Kevin D. Wilkens
Attorney, Agent, or Firm—John S. Schneider

[57] ABSTRACT

Two types of corner couplings together with horizontally extending and vertically extending beams form a multi-cornered paneled frame structure. One coupling connects, with suitable connectors, horizontally and inwardly extending panels to the horizontally extending beams and the other coupling connects, with suitable connectors, vertically extending panels to said horizontally extending beams and to the vertically extending beams. Other suitable connectors secure the two types of couplings to each other.

10 Claims, 2 Drawing Sheets

STRUCTURAL FRAME ASSEMBLY

BACKGROUND OF THE INVENTION

1. Field of the Invention

The present invention concerns a structural frame assembly for use in making showcases, furniture, fixtures, buildings and the like. More particularly, the invention concerns utilizing elongated beams, couplings or connectors, and panel members (top, bottom and/or intermediate) connected together in a manner that provides a sturdy, easily assembled and disassembled structure.

2. Description of the Prior Art

There are numerous prior art devices using beams, couplings or connectors, and panel members connected together in various ways to form structures of various shapes and sizes. Examples of such prior art devices are shown and described in U.S. Pat. Nos. 2,018,539; 2,389,899; 2,649,320; 3,436,047; 3,680,620; 3,901,613; 4,070,847; 4,368,936; 4,461,596; 4,585,365; 4,864,795; 4,932,808; 4,905,443; and 5,011,323. However, none of those devices is similar to the structure described and claimed herein.

SUMMARY OF THE INVENTION

Briefly described, the invention includes two types of beams and two types of couplings to form a multi-cornered panelled structure. One coupling connects, with selected connecting means, horizontally and inwardly extending panels to horizontal beams and the horizontal beams to the one coupling and the other coupling connects, with selected connecting means, vertically extending panels to horizontal beams and to vertical beams and the vertical beams to the other coupling. Other selected connecting means secure the two types of couplings to each other.

DETAILED DESCRIPTION OF THE INVENTION

Figure 1:
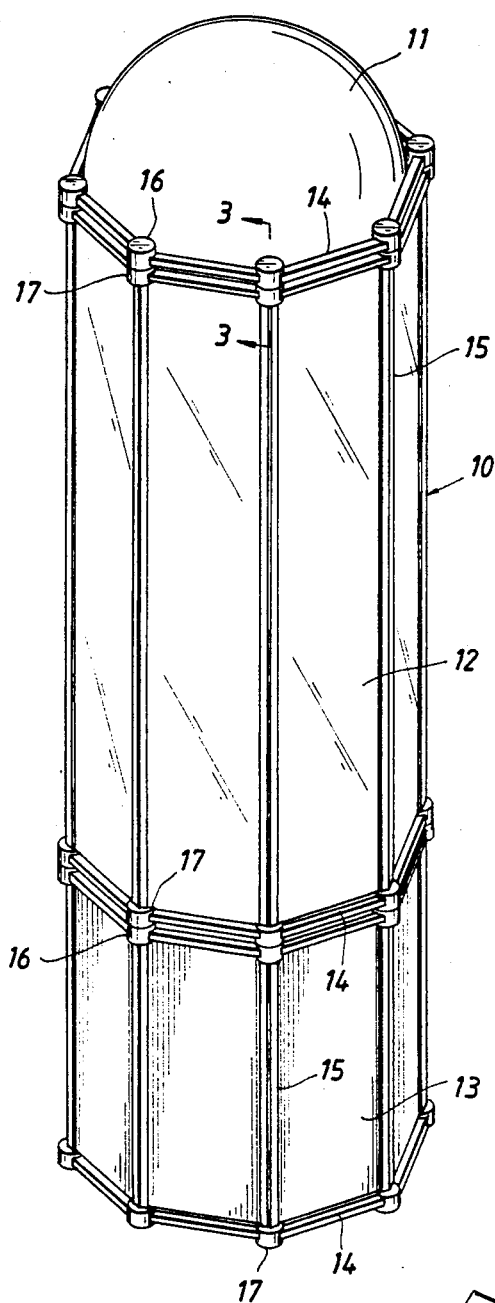
FIG. 1 is a perspective view of a structure assembled in accordance with the invention.

Referring to the drawings, in FIG. 1 there is shown an enclosed showcase or birdcage, generally designated 10, polygonal in cross-section and having an inwardly and laterally extending translucent dome panel 11, vertically extending translucent upper and lower side panels 12 and 13, horizontal beams 14, vertical beams 15 and corner couplings or connectors 16 and 17. Horizontal beams 14 connect to both couplings 16 and 17 whereas vertical beams 15 connect to coupling member 17 only. Details of those connections are shown in FIGS. 2 through 5.

Referring to those Figs., each coupling 16 has a circular, curved sidewall 20, flat ends 21 and 22 and an opening 23 in sidewall 20 that includes an obtuse angular groove 24 with the point or corner of the angle being in the center of coupling 16. Each end of horizontal beam 14 fits snugly into one of the grooves 24. Coupling 16 contains a hole or opening 25 extending from end-to-end through which a threaded bolt or screw 26 extends and threads into a nut 27. Additional holes or openings 28 and 29 extend through a portion of coupling 16, from end 22 to opening 23, through which threaded bolts 30 extend. Each bolt or screw 30 threads into a nut 31 positioned in each end of horizontal beam 14. Each nut 27 and 31 is removably fixed in proper position by any suitable commercially available pliable adhesive substance. One or more additional holes or openings, such as 32, may extend through coupling 16 to accommodate additional bolts as desired.

Figure 5:
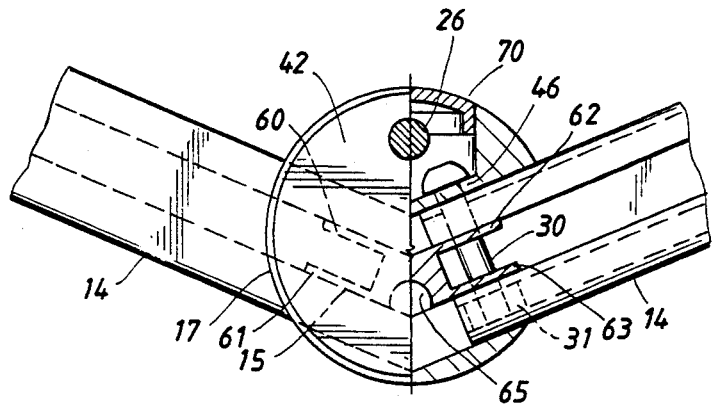
FIG. 5 is a partly sectional view taken on lines 5—5 of FIG. 2 showing two horizontal beams and a vertical beam connected to the other of the couplings.
Figure 2:
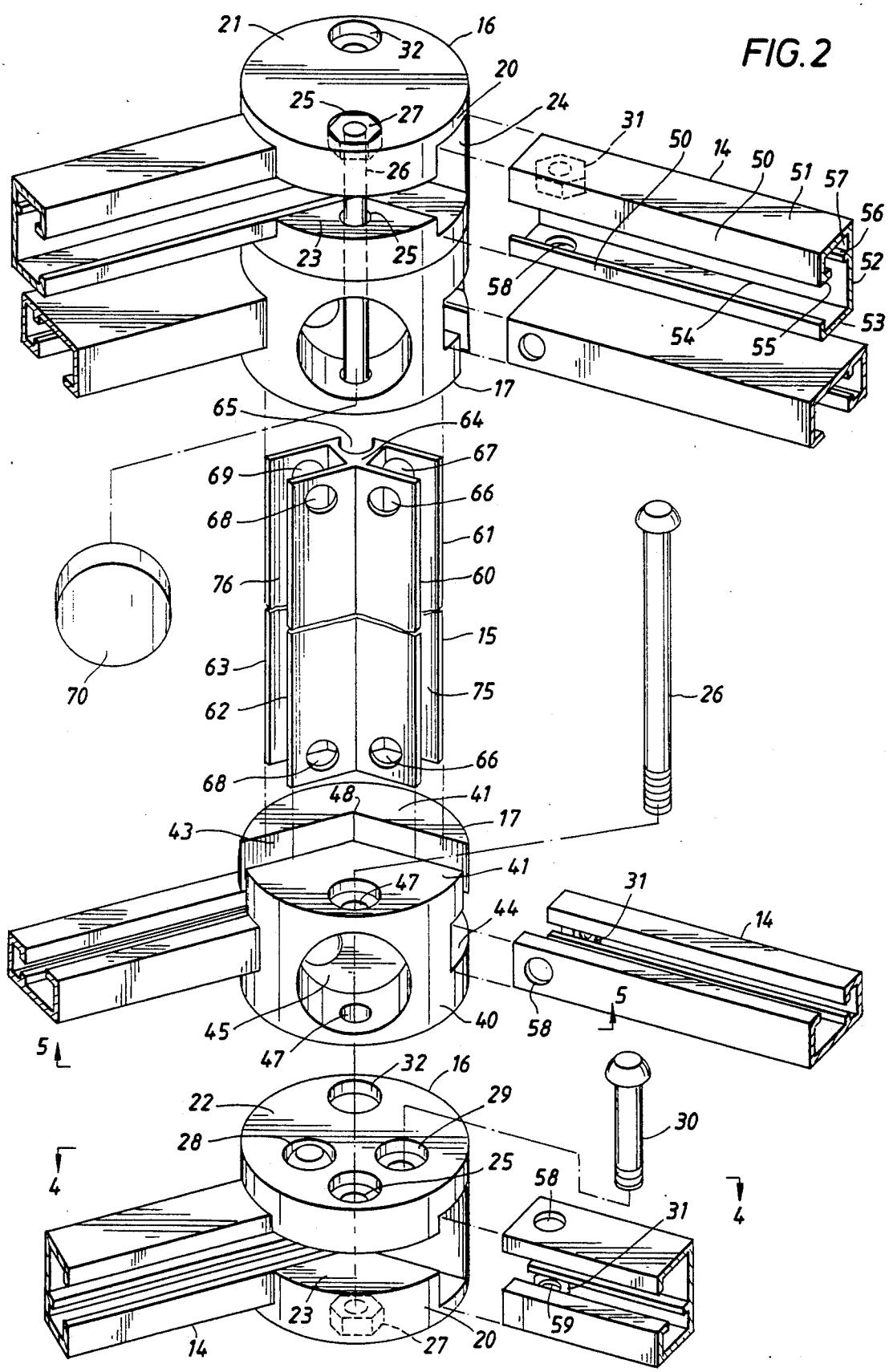
FIG. 2 is an exploded perspective view of the connected couplings and beams making up one of the corners of the structure shown in FIG. 1 (panelling has been omitted for the purpose of clarity)

Each coupling 17 has a circular, curved sidewall 40 and flat ends 41 and 42 (see FIG. 5). An obtuse angular opening 43 extends from end 41 partially through coupling 17 and forms an obtuse angular groove 44, the point of the angle being in the center of coupling 17 as indicated at 48. Sidewall 40 has an access opening 45 and two holes for threaded bolts 30 (only one of which is seen in FIG. 5) in an interior wall 46. Another hole 47 extends from end 41 through end 42 through which threaded bolt 26 extends to engage nut 27.

Each horizontal beam 14 is elongated, hollow, rectangular in cross-section and contains four sides 50, 51, 52 and 53. Side 50 has an opening 54 along its length to provide a slotted space for receiving an end edge of panel 11, 12 or 13. An inwardly extending flange 55 on side 50 together with a raised ridge 56 formed on the interior of side 52 forms a cavity or recess 57 in which a nut 31 fits at each end of beam 14. An opening 58 formed in side 53 at each end of beam 14, through which a bolt 30 extends, is aligned with the hole in nut 31. When bolts 30 are threaded to nuts 31 sides 51 and 53 of beam 14 are drawn towards each other to secure the edges of panels 11, 12 and 13 in the spaces provided by openings 54 and to secure beam 14 to coupling 16.

Vertical beam 15 is angular in cross-section and formed of two elongated, parallel, spaced-apart angled side members 60, 61, and 62, 63 on each side of the point or corner 64 of the angle. An outer decorative groove 65 is formed along the length of beam 15 at that corner. Side members 60, 61 and 62, 63 are designed to fit into angular opening 43 in coupling 17. Angle sides 60, 61 have aligned openings 66, 67, respectively, and angle sides 62, 63 have aligned openings 68, 69, respectively, at each end of beam 15. Bolts 30 extend through openings 66, 67 and 68, 69 and engage nuts 31 on beam 14. Side members 60 and 61 form a space or groove 75 and side members 62 and 63 form a space or groove 76 for receiving vertically extending edges or rims of panels 12 (and 13). When threaded bolts 30 are threaded to nuts 31 side members 60 and 61 and side members 62 and 63 are drawn towards each other to secure the edges of panels 12 (and 13) in grooves 75 and 76 and to secure beams 14 and 15 to coupling 17.

A cap 70 may be used to close opening 45 in coupling 17. Stops 71 (see FIG. 4) prevent further penetration of horizontal beams 14 in grooves 24 and 44 of couplings 16 and 17, respectively, and aid in properly locating openings 58 through which bolts 30 extend.

Figure 3:
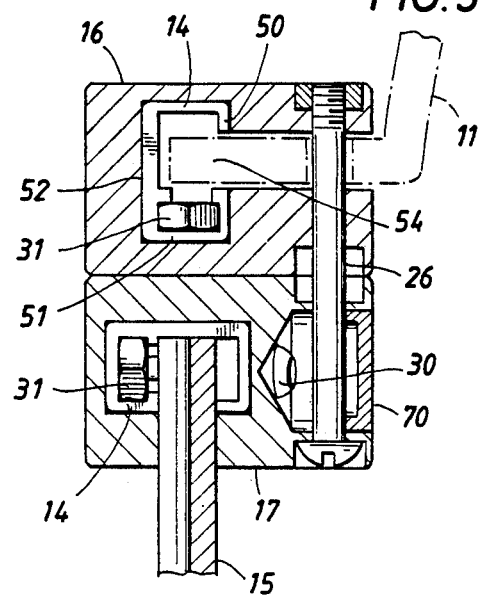
FIG. 3 is a view taken on lines 3—3 of FIG. 1.
Figure 4:
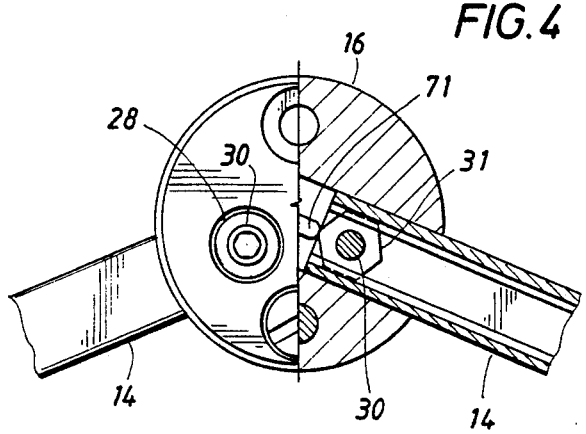
FIG. 4 is a partly sectional view taken on lines 4—4 of FIG. 2 showing two horizontal beams connected to one of the couplings.

In assembling birdcage 10 each corner of the structure, such as the corner illustrated in FIG. 3, is assembled as follows:

The flat edge of dome panel 11 is inserted into openings 54 in horizontal beams 14. Nuts 31 are positioned in cavities 57 and the ends of beam 14 are inserted in groove 24 of coupling 16 until stops 71 are contacted. Bolts 30 are then secured to nuts 31 to fasten beams 14 and panel 11 to coupling 16. The edges of panels 12 are inserted into openings 54 in other horizontal beams 14 and into spaces 75 and 76 in beams 15. An end of vertical beam 15 is inserted in opening 43 (groove 44). Each other beam 14 is inserted in groove 44 of coupling 17 to stops 71, not shown. Bolts 30 are then secured to nuts 31 to fasten the ends of beams 14 and the end of beam 15 to coupling 17. Bolt 26 extends through openings 25 and 47 and threads into nut 27 to secure couplings 16 and 17 to each other. The other corners are assembled in a similar manner.

The terms panel and panel member encompass flat, continuous side panes, such as 12 and 13, rounded dome members, such as 11, flat, continuous bottoms, not shown, and flat, continuous inner intermediate parts or members extending between the horizontal beams 14, not shown, as well as inner top, intermediate and bottom frameworks extending between the horizontal beams formed of spaced-apart bars, wires and/or rods, also not shown. The corners of the structure embodied herein may be any angle ninety degrees or greater and each type coupling may be used individually or together depending upon the desired structure. Further, the couplings and beams and bolts, screws and nuts may be any desired size. Plugs may be used to conceal bolts or screws in the couplings and countersinks for screwheads may be made deeper to conceal screwheads with plug inserts. Although shown circular the couplings may have other shapes for example, square, rectangular, etc. Also, beams 14 may have additional openings 58 and beams 15 may have additional openings 66, 67 and 68, 69 along their lengths to accommodate additional bolts 30 for engagement with nuts 31.

The assembly described herein can be used in building various structures other than birdcages. For example, this assembly, and/or parts thereof, can be used in constructing different types of showcases, furniture, fixtures and buildings.

The parts may be used right side up, upside down, or sideways depending on the structural frame assembly desired and the parts may be made out of any desired material, including, but not limited to aluminum, steel and/or plastics.

Other changes and modifications may be made in the illustrative embodiments of the invention shown and/or described herein without departing from the scope of the invention as defined in the appended claims.

Having fully described my invention I claim:

1. A structure comprising:
    first and second couplings having contacting surfaces;
    first beams extending in one directional orientation and having first and second positions and connected to said first couplings when said first beams are in said first positions and connected to said second couplings when said first beams are in said second positions;
    second beams arranged transverse to said first beams and connected to said second couplings and to said first beams when said first beams are in said second positions; and
    means securing said first and second couplings to each other.

2. A structure as recited in claim 1 comprising:
    first panel members connected to and extending between said first beams when said first beams are in said first positions and second panel members connected to and extending between said first and second beams when said first beams are in said second positions; and
    means connecting said beams to said couplings, said couplings to each other, and said panel members to said beams comprising nuts and bolts.

3. A structure as recited in claim 2 in which said structure comprises:
    a polygonally shaped enclosure; and
    said first beams extend horizontally.

4. A structure as recited in claim 3 in which each first beam comprises:
    four sides, one of which has an opening along the length thereof to form a slotted space within said first beam for receiving edges of said first panel members, means within said slotted space forming a confined area along one side to receive one of said nuts at each end thereof, and an opening on an opposite side and at each end thereof through which one of said bolts extends to threadedly engage said one nut.

5. A structure as recited in claim 4 in which each second beam comprises:
    two connected sets of parallel, spaced-apart side members, each set of side members forming a slot for receiving an edge of said second panel member and each set extending at an angle to each other and each set having aligned openings at each end through which said one bolt extends to threadedly engage said one nut.

6. A structure as recited in claim 5 in which each of said first couplings includes:
    at least one exterior side wall and flat ends and an interior angular groove extending through said side wall, each leg of said groove receiving an end of said first beam when said first beam in said first position and each said end of said first beam containing said opening and nut; and
    an opening extending end-to-end through said first coupling.

7. A structure as recited in claim 6 in which each of said second couplings includes:
    at least one exterior side wall and flat ends and a first interior angular groove extending through said side wall, each leg of said first groove receiving an end of said first beam when said first beam is in said second position; and
    a second interior groove extending through one of said ends of said second coupling into said first groove for receiving an end of said second beam, said end extending into said slotted space of said first beam when said first beam is positioned in said first coupling; and
    at least one opening extending end-to-end through said second coupling aligned with said opening extending end-to-end through said first coupling when said first and second couplings are connected together.

8. A structural assembly comprising:
    a plurality of elongated first beams, each first beam having four sides one of which has an opening along its length to form a slotted space within said first beams; means within said slotted space forming a confined area along one side, a nut positioned in said confined area, an opening formed on an opposite wall, and a bolt extending through said opening to threadedly engage said nut;

a plurality of elongated second beams extending transverse to said first beams, each second beam comprising two connected sets of parallel, spaced-apart side members, each set of side members forming a slot, each set extending at an angle to each other, and each set having aligned openings at each end through which a bolt extends to engage said nut;

a first coupling having at least one side wall and flat ends and an interior angular first groove, extending through said side wall, each side of said first groove receiving an end of said first beam containing said opening and said nut and aligned openings in the ends of said first coupling extending therethrough, said first coupling also having spaced-apart openings extending through one end of said first coupling to accommodate threaded bolts; and a second coupling having at least one side wall and flat ends and an interior angular second groove extending through said side wall, each side of said second groove receiving the ends of said first beam containing said opening and said nut, said second coupling also having an interior third groove extending through one end of said second coupling into said second groove for receiving an end of said second beam having said aligned plate openings, said end extending into said slotted space of said first beam when said first beam is in position within said first coupling, and aligned openings in the ends of said first coupling extending therethrough.

9. A structural assembly as recited in claim 8 forming an enclosure and including first horizontally and inwardly extending panels connected to said first beams and second vertically extending panels connected to said second beams.

10. A structural frame assembly comprising:

a plurality of first beams extending in one directional orientation and having first and second positions;

a plurality of second beams arranged transverse to said first beams;

first panels extending in one direction connected to said first beams when said first beams are in said first positions;

second panels extending in a direction transverse to said one direction and connected to said first beams when said first beams are in second positions and to said second beams;

a first coupling having means for receiving the ends of two of said first beams to form an angle therewith;

means within said first coupling for securing said first beams to said first coupling and said first panels to said first beams;

a second coupling in contact with said first coupling and having means for receiving the ends of two of said first beams to form an angle therewith and for receiving one end of said second beam;

means within said second coupling for securing said first beams to said second coupling and said second panels to said first and second beams and said one end of said second beams to said second coupling; and means for securing said first and second couplings to each other.

* * * * *